Feb. 15, 1927. 1,617,736
J. E. ARNOLD
METHOD AND MEANS FOR SUPPLYING FUEL TO HYDROCARBON ENGINES
Filed Sept. 17, 1924  3 Sheets-Sheet 1

INVENTOR:
James Earl Arnold
by Chas. H. Luther
ATTORNEY.

Feb. 15, 1927.

J. E. ARNOLD 1,617,736

METHOD AND MEANS FOR SUPPLYING FUEL TO HYDROCARBON ENGINES

Filed Sept. 17, 1924     3 Sheets-Sheet 2

INVENTOR:
James Earl Arnold
by Chas. W. Luther
ATTORNEY.

Feb. 15, 1927.

J. E. ARNOLD 1,617,736

METHOD AND MEANS FOR SUPPLYING FUEL TO HYDROCARBON ENGINES

Filed Sept. 17, 1924  3 Sheets-Sheet 3

INVENTOR:
James Earl Arnold
By Chas. H. Luther
ATTORNEY.

Patented Feb. 15, 1927.

1,617,736

UNITED STATES PATENT OFFICE.

JAMES EARL ARNOLD, OF GROTON, CONNECTICUT, ASSIGNOR OF ONE-HALF TO FRED PARKER CARR, OF BOSTON, MASSACHUSETTS.

METHOD AND MEANS FOR SUPPLYING FUEL TO HYDROCARBON ENGINES.

Application filed September 17, 1924. Serial No. 738,307.

My invention has reference to an improvement in hydrocarbon engines and more particularly to an improvement in method and means for supplying fuel, such as oil, to Diesel engines.

In a four cylinder Diesel engine as heretofore constructed, it is necessary to have fuel measuring pumps and comparatively large high pressure air compressors for forcing air to the oil sprayers at a pressure of six hundred to one thousand pounds pressure per square inch. Such air compressors are complicated in construction, expensive to manufacture and they have to be constantly watched when in operation, as they are liable to get out of order easily. In the usual form of Diesel engine having four cylinders, one or more high pressure air compressors and four measuring oil pumps, one for each cylinder, are used and in an eight cylinder Diesel engine, two or more high pressure air compressors and eight measuring oil pumps, one for each cylinder, are used. The air pressure from such air compressors is uneven therefore the oil is sprayed into the engine cylinders at a diminishing pressure. A Diesel engine unit including high pressure air compressors and fuel measuring pumps and costing approximately two hundred and fifty thousand dollars, the cost of the high pressure air compressors is approximately one third the cost of the entire engine unit and the cost of the fuel measuring pumps is extremely high.

The object of my invention is to improve the method and means for supplying fuel, such as oil, to hydrocarbon engines, such as Diesel engines, whereby approximately one third of the cost of such engine units, as heretofore constructed, is eliminated.

Another object of my invention is to eliminate the heretofore necessary, comparatively large and expensive high pressure air compressors, thereby measurably reducing the cost of manufacturing such engine units.

Another object of my invention is to provide a hydrocarbon engine, such as a Diesel engine, with a method and means of injecting and spraying oil into the cylinders of the engine at a uniform pressure.

A further object of my invention is to improve the means for spraying oil into the cylinders of Diesel engines.

My improved method of injecting oil into the cylinder of a hydrocarbon engine, such as a Diesel engine, consists, in connection with auxiliary mechanical means, of utilizing a predetermined minimum portion of the compressed air in the compression chamber of the engine cylinder, when the piston is on its compression stroke, for injecting the oil into the compressor chamber of the engine.

In carrying my improved method of supplying fuel to hydrocarbon engines into practice I find that it may be used successfully with any form of a hydrocarbon engine, but that it is particularly adapted for injecting and spraying oil into the cylinders of the form of hydrocarbon engines known as Diesel engines.

My invention consists in the peculiar and novel method and construction of the means for supplying fuel, such as oil to hydrocarbon engines, such as Diesel engines, said means having details of construction, as will be more fully set forth hereinafter and claimed.

Figure 5:
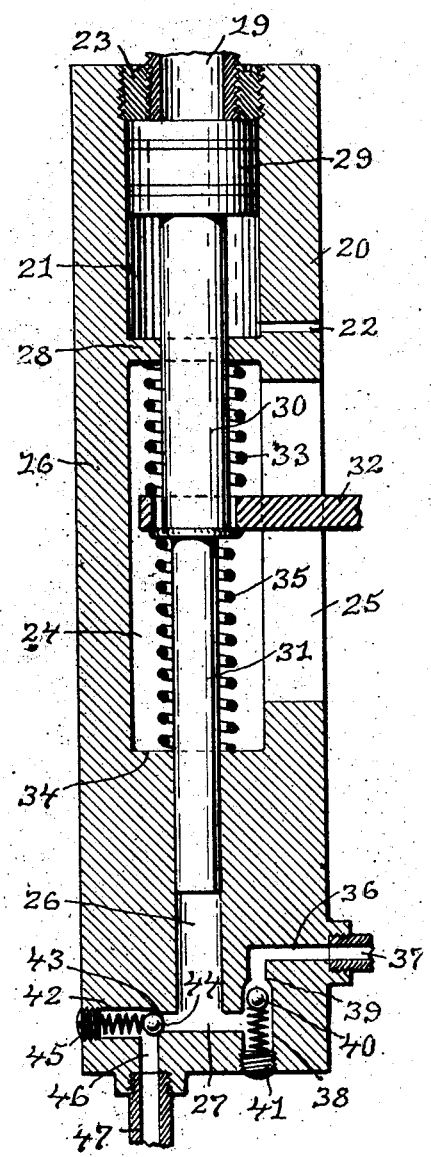
Figure 6:
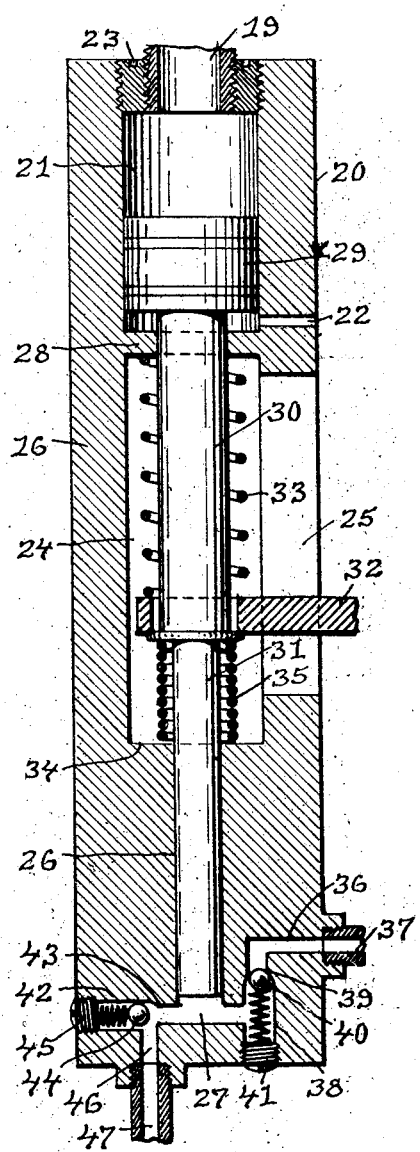

Figure 5 is a vertical sectional view of my improved fuel measuring and injecting pump showing the operating parts in the position they would assume at the end of drawing the required amount of oil into the pump, and Figure 6 is a vertical sectional view of the pump similar to Figure 5 showing the operating parts in the position they would assume at the end of injecting the oil into the compression chamber of the engine.

In the drawings 7 indicates the upper portion of the cylinder of a Diesel engine and 8 my improved means for supplying fuel to the compression chamber of the cylinder of the engine.

Figure 1:
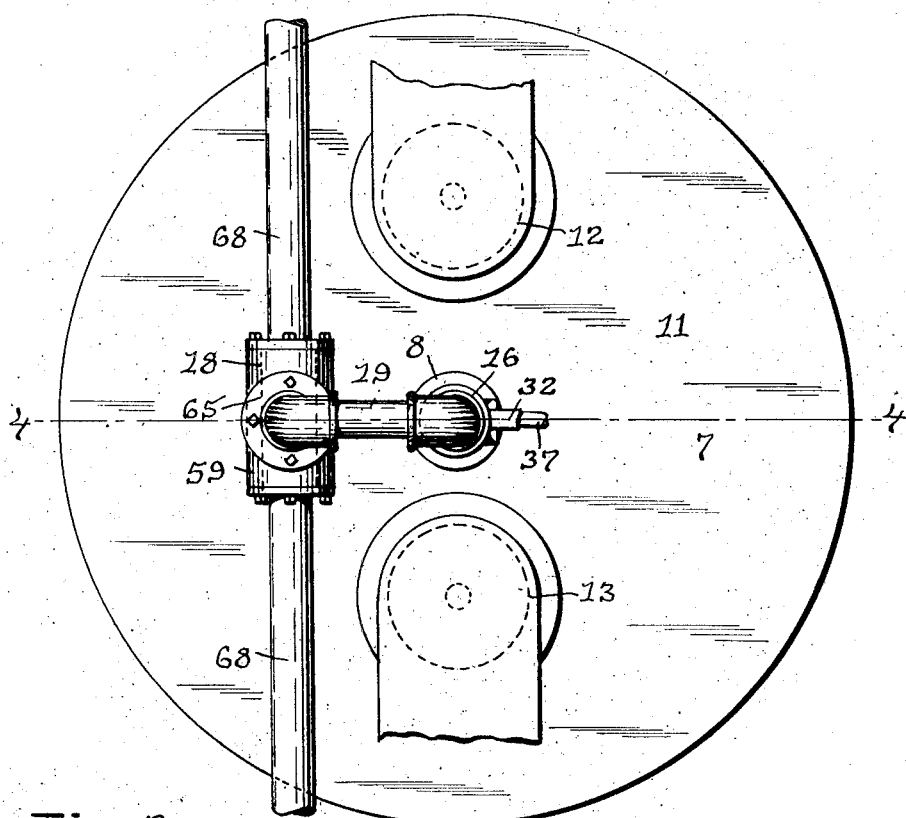
Figure 1 is a top plan view of a cylinder of a Diesel engine provided with my improved means for supplying fuel, such as oil to the compression chamber of the engine.

In the cylinder 7 is the usual piston 9 operated by the usual connecting rod 10 which is operatively connected to the crank of the engine crankshaft, not shown. Secured to the top of the cylinder 7, in any well known way, is a cylinder head 11 having the usual air intake valve 12 and exhaust valve 13, as indicated in broken lines in Figure 1. In the cylinder 7, is the usual compression chamber C. In the cylinder head 11 I form an off center vertical compressed air port 14 and a central vertical oil spraying port 15.

Figure 4:
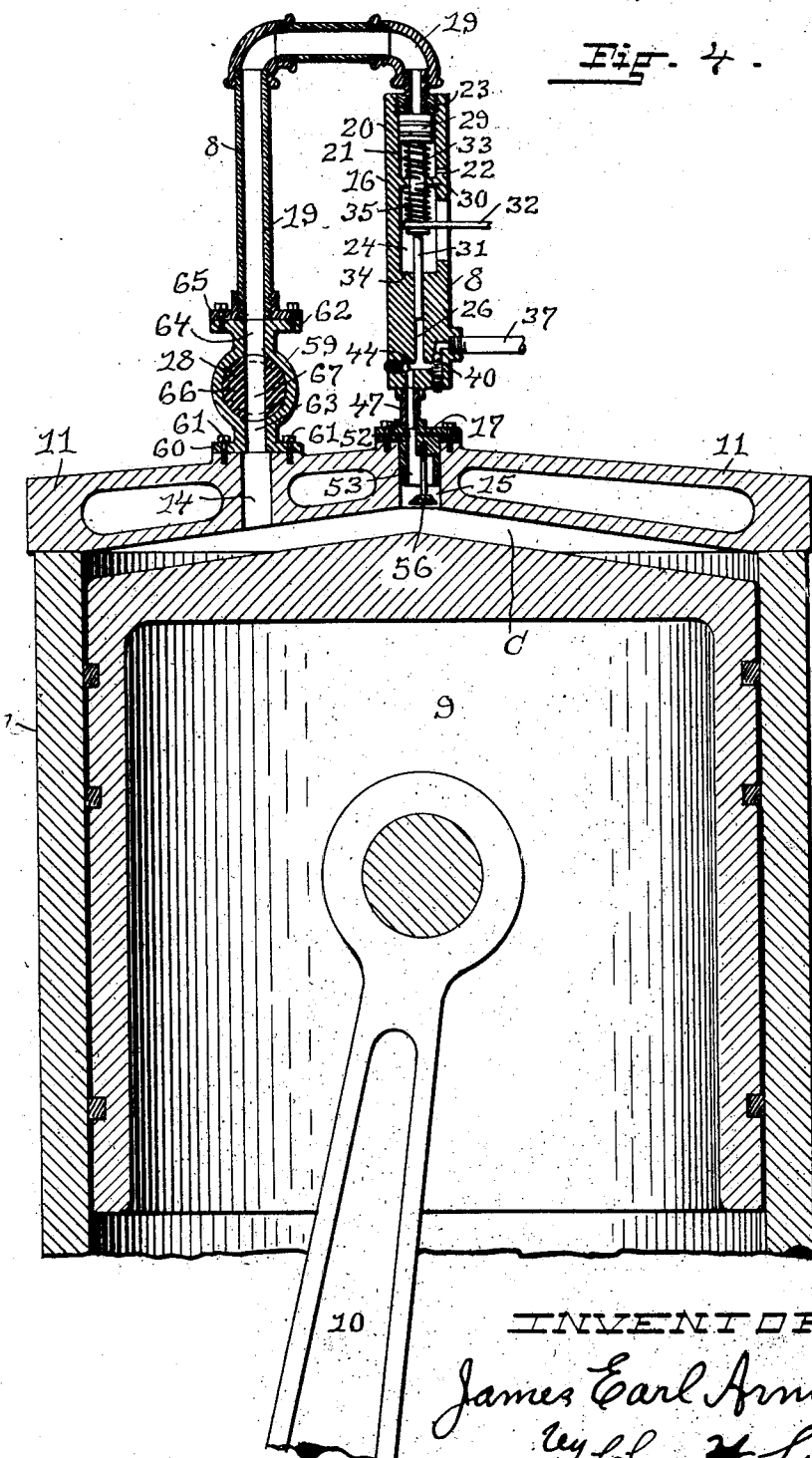
Figure 4 is a central vertical sectional view taken on line 4, 4, of Figure 1, through the upper portion of the cylinder, piston, cylinder head and my improved means for injecting and spraying oil into the compression chamber of the engine.

My improved means for injecting and spraying oil into the compression chamber of the engine cylinder is a complete unit, one for each cylinder of the engine and consists essentially of my improved oil measuring and injecting pump 16, oil spraying device 17, compressed air pump controlling valve 18 and piping 19 which operatively connects the valve 18 with the pump 16, as shown in Figure 4.

Figure 2:
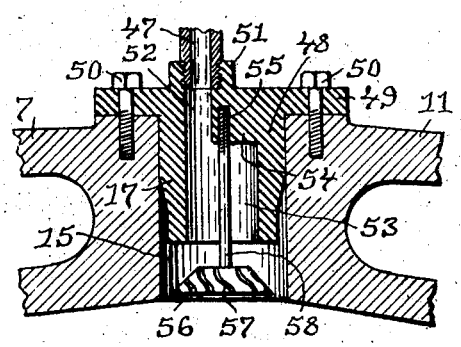
Figure 2 is an enlarged detail vertical sectional view showing a portion of the cylinder head and the location of my improved sprayer for spraying oil into the compression chamber of the engine.

My improved oil measuring and injecting pump 16 consists of a cylindrical body member 20 having a piston-chamber 21 from which is an air vent 22 and which is closed at its upper end by a screw-ring 23 and to this screw-ring 23 is operatively connected this end of the piping 19. Below the piston-chamber 21 is a spring chamber 24 and in the side of the body member 20 is a vertical slot 25 connecting with the spring-chamber 24. Extending downwards from the spring-chamber 24 is a plunger bore 26 which connects at its lower end to a transverse oil duct 27. A transverse partition 28 forms the bottom of the piston-chamber 21 and the top of the spring-chamber 24. In the piston-chamber 21 is a piston 29 having a stem 30 which extends downwards through the partition 28 and on the lower end of the stem 30 is a plunger 31 which extends downwards into the plunger bore 26. Connected to the stem 30 is a controlling arm 32 which extends outward through the slot 25 and is operatively connected to the throttle and governor mechanism of the engine, not shown. On the stem 30 and intermediate the partition 28 and the controlling arm 32 is a coiled spring 33 and on the stem 30 and intermediate the controlling arm 32 and the bottom 34 of the spring-chamber 24 is a coiled spring 35. Extending in from the side of and adjacent the lower end of the body member 20 is a transverse oil inlet duct 36 to which is connected a gravity oil pipe 37, which comes from a sauce of oil supplied by gravity, not shown. This transverse oil inlet duct 36 connects with a vertical inlet oil duct 38 having a valve seat 39 controlled by a spring operated ball valve 40 and the lower end of the oil inlet duct 38 is closed by a screw-plug 41 which also holds the ball valve in place. Extending in from the opposite side of and adjacent the lower end of the body member 20 is a transverse oil outlet duct 42 connecting with the transverse oil duct 27 and having a valve seat 43 controlled by a spring operated ball valve 44 and the outer end of the oil outlet duct 42 is closed by a screw-plug 45, which also holds the ball valve in place. Connecting with the transverse oil outlet duct 42 is a vertical oil outlet duct 46 to which is connected an oil outlet pipe 47, as shown in Figures 5 and 6. The other end of the oil outlet pipe 47 is connected to the oil spraying device 17, as shown in Figures 2 and 4 and which will be described hereinafter.

Figure 3:
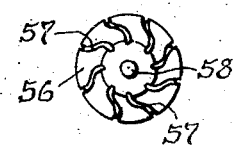
Figure 3 is an enlarged top plan view of my improved sprayer.

My improved oil spraying device 17 consists of a cylindrical plug 48 shaped to fit into the oil spraying port 15 in the cylinder head 11 and has a flanged upper end 49 secured to the top of the cylinder head 11 by bolts 50, 50. On the flanged upper end 49 is a pipe boss 51 to which the lower end of the oil pipe 47 is secured by screwing it into the pipe boss, as shown in Figure 2. The body of the plug 48 is constructed to have an oil inlet port 52 forming a continuation of the pipe 47 and this oil inlet port 52 merges into an enlarged circular oil outlet port 53 in which is an inwardly formed projecting portion 54 having a central vertical screw-threaded hole 55. A truncated cone shaped sprayer head 56 is constructed to have a series of curved oil spraying grooves 57, 57, as shown in Figures 2 and 3 and a central stem 58, the upper end of which screws into the screw-threaded hole 55, as shown in Figure 2, thereby securing the sprayer head 56 in place.

The pump controlling valve 18 is in the form of a rotary valve in a casing 59 having a flanged base 60 secured to the cylinder head 11, by bolts 61, 61 and a flanged upper end 62. The base 60 has an inlet air port 63 opening into the compressed air port 14 in the cylinder head 11, and the upper end 62 has an air outlet port 64 opening into this end of the piping 19 which is secured to a flanged pipe boss 65 which in turn is secured to the flanged upper end 62 of the valve casing 59, as shown in Figure 4. The rotary part 66 of the valve has a transverse air port 67 which coincides with the air ports 63 and 64, when the valve is in its open position. This rotary part 66 of the valve is formed a part of a horizontal valve shaft 68, shown in Figure 1 and this valve shaft 68 extends across all of the cylinders, where more than one cylinder is used, and connects with all of the pump controlling valves, one for each cylinder. This valve shaft 68 is operatively connected to the crank-shaft of the engine by any well known mechanical means, not shown, and the valve or valves are timed to open, as will be hereinafter explained.

The piping 19 operatively connects the pump controlling valve 18 with the oil measuring and injecting pump 16, as shown in Figure 4. This piping may be of any usual construction and it may have a water jacket, not shown.

The operation of my improved method and means for supplying fuel to a four cycle Diesel engine is as follows. The oil measuring and injecting pump 16 is controlled and set by the throttle and governor mechanism of the engine, not shown, through the controlling arm 32, which sets the position of the pump piston 29 to pump and inject the required amount of oil. The coiled springs 33 and 35 assisting in holding the piston 29 in the required position. The pump controlling valve 18 is timed to open and close as will be hereinafter explained.

On the suction stroke of the piston 9, air is drawn into the compression chamber C through the air inlet valve 12. The pump controlling valve 18 is now open and this suction stroke of the engine piston draws air from the pump piston chamber 21 through the piping 19 and air ports 64, 67, 63 and 14 and moves the pump piston 29 and plunger 31 upwards. This upward movement of the plunger 31 opens the ball valve 40, as shown in Figure 5, and draws into the pump, below the plunger 31, the required amount of oil, through the oil ducts 36, 38 and 27. The ball valve 40 now assumes its closed position, as shown in Figure 6.

It will be noticed in Figures 5 and 6 that the end area of the pump piston 29 is greatly in excess of the end area of the pump plunger 31.

On the compression stroke of the engine piston, air is compressed in the compression chamber C to a pressure of six hundred to one thousand pounds pressure to the square inch. On this compression stroke of the engine piston the pump controlling valve 18 is timed to open seven degrees before firing top center and holds in the open position to forty two degrees past firing top center. The compressed air is now forced upwards through the air ports 14, 63, 64 and piping 19, forcing the pump piston 29 and plunger 31 downwards, the air under the pump piston 29 escaping through the air vent 22. This downward movement of the plunger 31 opens the ball valve 44 and forces the oil, at a greatly increased pressure, through the oil ducts 27 and 46 and pipe 47, and through the oil spraying device 17, which sprays the oil in the form of a fine spray into the compression chamber C of the engine. The oil under great pressure strikes against the truncated cone shaped spraying head 56 and entering the curved oil spraying grooves 57, 57, is given a whirling motion, thereby greatly increasing the fine spray of the oil. The above operations are repeated in each four cycle operation of the engine.

In the use of my improved method of supplying fuel, such as oil, to hydrocarbon engines, I do not confine myself to the mechanical means shown in connection with a Diesel engine, as such mechanical means would necessarily vary or be modified for different kinds and makes of hydrocarbon engines.

Having thus described my invention I claim as new:—

1. In a hydrocarbon engine, means operated by compressed air from the compression chamber of the engine, to pump and inject oil into the compression chamber of the engine, said means consisting of an oil measuring and injecting pump having a body in which is a piston chamber, a spring chamber, a plunger bore, oil inlet ducts controlled by a ball valve, oil outlet ducts controlled by a ball valve, a piston in the piston chamber and having a stem, a plunger on the stem and in the plunger bore, coiled springs on the stem, in the spring chamber, means for operatively connecting the piston chamber with the compression chamber of the engine, means for operatively connecting the oil outlet ducts with the compression chamber of the engine, means for operatively connecting the oil inlet ducts with a source of oil supply and means comprising a controlling arm intermediate the coiled springs for operatively connecting the piston stem with the throttle and governor mechanism of the engine.

2. In a hyrocarbon engine, the combination of the following instrumentalities, an engine cylinder having a piston, a compression chamber and a cylinder head having an outlet air port and an inlet oil spraying port, a valve connected with the outlet air port, an oil spraying device in the inlet oil spraying port, an oil measuring and injecting pump, having pistons, a piston stem, coiled springs on the piston stem and operatively connected with the oil spraying device, a controlling arm intermediate the coiled springs on the piston stem, means for operatively connecting the valve with the oil measuring and injecting pump, means for operatively connecting the oil measuring and injecting pump with an engine throttle and governor mechanism and means for operatively connecting the oil measuring and injecting pump with a source of oil supply for the purpose as described.

3. A hydrocarbon engine having a cylinder, a piston in the cylinder, a compression chamber in the cylinder, an inlet port, an outlet port, an oil measuring and injecting pump having large and small piston chambers, a piston stem in the small piston chamber and forming a small piston, a large piston on the piston stem in the large piston chamber, an abutment in the large piston chamber, a coiled spring on the piston stem and engaging the abutment, a coiled spring on the piston stem engaging the opposite end of the large piston chamber, a controlling arm intermediate the coiled springs and extending outwards through an opening in the pump, a valve controlled oil duct extending into the small piston chamber, a valve controlled outlet duct from the small piston chamber, a pipe connecting the outlet duct with the inlet port of the engine, a pipe connecting the outlet port of the engine with the large piston chamber of the pump, said pipe having a valve adapted to control the force of compression from the compression chamber of the engine to the large piston chamber of the pump, for the purpose as described.

In testimony whereof, I have signed my named to this specification.

JAMES EARL ARNOLD.